United States Patent
Khan et al.

(10) Patent No.: US 9,756,132 B2
(45) Date of Patent: Sep. 5, 2017

(54) VEHICLE COMMUNICATION SYSTEM

(71) Applicant: Jaguar Land Rover Limited, Coventry (GB)

(72) Inventors: Mohammed Khan, Coventry (GB); Howard Siswick, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 14/893,458

(22) PCT Filed: May 29, 2014

(86) PCT No.: PCT/EP2014/061208
§ 371 (c)(1),
(2) Date: Nov. 23, 2015

(87) PCT Pub. No.: WO2014/191536
PCT Pub. Date: Dec. 4, 2014

(65) Prior Publication Data
US 2016/0127473 A1    May 5, 2016

(30) Foreign Application Priority Data
May 31, 2013   (GB) .................................. 1309748.0

(51) Int. Cl.
*H04B 7/00*      (2006.01)
*H04L 29/08*    (2006.01)
(Continued)

(52) U.S. Cl.
CPC .......... *H04L 67/12* (2013.01); *G07C 9/00309* (2013.01); *H04W 4/025* (2013.01);
(Continued)

(58) Field of Classification Search
None
See application file for complete search history.

(56) References Cited

U.S. PATENT DOCUMENTS 5,417,312 A    5/1995   Tsuchitani et al.
5,561,331 A   10/1996  Suyama et al.
(Continued)

FOREIGN PATENT DOCUMENTS

CN          1394253 A       1/2003
CN       201893808 U       7/2011
(Continued)

OTHER PUBLICATIONS

Combined Search and Examination Report, GB 1309743.1, Nov. 29, 2013, 7 pages.
(Continued)

*Primary Examiner* — Mohammed Rachedine
(74) *Attorney, Agent, or Firm* — Myers Bigel, P.A.

(57) ABSTRACT

A communication system for facilitating control over a function of a vehicle (102) comprises a base station (104) positioned in the vehicle (102) and a mobile communication unit (122). The base station (104) comprises a first transmitter for transmitting a signal to the mobile communication unit (122) and a first receiver for receiving a signal from the mobile communication unit (122). The base station (104) is further configured to cause the mobile communication unit (122) to operate in accordance with a limited-response duty cycle.

20 Claims, 6 Drawing Sheets

(51) Int. Cl.
  *G07C 9/00* (2006.01)
  *H04W 4/04* (2009.01)
  *H04W 4/02* (2009.01)
  *H04W 52/02* (2009.01)
  *H04W 12/06* (2009.01)

(52) U.S. Cl.
  CPC ....... *H04W 4/046* (2013.01); *H04W 52/0212* (2013.01); *H04W 52/0229* (2013.01); *H04W 52/0251* (2013.01); *G07C 2009/0038* (2013.01); *G07C 2009/0096* (2013.01); *G07C 2209/63* (2013.01); *H04W 12/06* (2013.01); *Y02B 60/50* (2013.01)

(56) References Cited

U.S. PATENT DOCUMENTS

| | | | |
|---|---|---|---|
| 6,034,617 A * | 3/2000 | Luebke | G07C 9/00309 307/10.2 |
| 6,236,333 B1 | 5/2001 | King | |
| 6,259,362 B1 * | 7/2001 | Lin | B60Q 9/00 307/10.1 |
| 7,844,377 B2 | 11/2010 | Oota et al. | |
| 8,761,603 B1 | 6/2014 | Maleki | |
| 9,193,331 B2 | 11/2015 | Endo | |
| 9,220,078 B1 | 12/2015 | Bietz | |
| 2001/0038328 A1 | 11/2001 | King et al. | |
| 2002/0109587 A1 | 8/2002 | Attring et al. | |
| 2003/0181169 A1 | 9/2003 | Mutoh | |
| 2006/0077042 A1 | 4/2006 | Hock | |
| 2006/0091997 A1 | 5/2006 | Conner et al. | |
| 2007/0024121 A1 | 2/2007 | Teshima et al. | |
| 2007/0024416 A1 | 2/2007 | Tang et al. | |
| 2007/0038344 A1 | 2/2007 | Oota et al. | |
| 2007/0085658 A1 | 4/2007 | King et al. | |
| 2008/0284564 A1 | 11/2008 | Leitch | |
| 2009/0146846 A1 | 6/2009 | Grossman | |
| 2009/0289759 A1 | 11/2009 | Tsuchiya et al. | |
| 2010/0052931 A1 | 3/2010 | Kolpasky et al. | |
| 2010/0075656 A1 | 3/2010 | Howarter et al. | |
| 2010/0076622 A1 | 3/2010 | Dickerhoof et al. | |
| 2010/0138079 A1 | 6/2010 | Ögren | |
| 2010/0245038 A1 | 9/2010 | Ghabra et al. | |
| 2010/0271171 A1 | 10/2010 | Sampei | |
| 2011/0156885 A1 | 6/2011 | Baek et al. | |
| 2011/0224870 A1 | 9/2011 | Tan | |
| 2012/0044974 A1 | 2/2012 | Mukai et al. | |
| 2012/0092129 A1 | 4/2012 | Lickfelt | |
| 2012/0129545 A1 | 5/2012 | Hodis et al. | |
| 2012/0158214 A1 | 6/2012 | Talty et al. | |
| 2012/0262340 A1 * | 10/2012 | Hassan | G01S 11/02 342/458 |
| 2012/0268242 A1 | 10/2012 | Tieman et al. | |
| 2013/0054095 A1 | 2/2013 | Suzuki et al. | |
| 2013/0143594 A1 * | 6/2013 | Ghabra | H04W 24/00 455/456.1 |
| 2013/0171995 A1 | 7/2013 | Fujishiro et al. | |
| 2013/0342379 A1 | 12/2013 | Bauman et al. | |
| 2015/0080021 A1 | 3/2015 | Bietz | |
| 2015/0168174 A1 | 6/2015 | Abramson | |
| 2016/0059827 A1 | 3/2016 | Uddin et al. | |
| 2016/0182548 A1 | 6/2016 | Ghabra et al. | |

FOREIGN PATENT DOCUMENTS

| | | |
|---|---|---|
| CN | 102582537 A | 7/2012 |
| CN | 102747893 A | 10/2012 |
| CN | 103946899 A | 7/2014 |
| DE | 10 2006 037 237 A1 | 2/2008 |
| DE | 20 2010 017 197 U1 | 10/2011 |
| EP | 1 143 089 A2 | 10/2001 |
| EP | 1 447 775 A2 | 8/2004 |
| EP | 1 916 162 A2 | 4/2008 |
| GB | 2 335 002 A | 9/1999 |
| GB | 2 496 755 A | 5/2013 |
| GB | 2496755 A | 5/2013 |
| JP | 2003-278418 A | 10/2003 |
| JP | 2004-308165 A | 11/2004 |
| JP | 2005-009200 A | 1/2005 |
| JP | 2007-039922 A | 2/2007 |
| JP | 2007-049561 A | 2/2007 |
| JP | 2008-255750 A | 10/2008 |
| JP | 2009-038745 | 2/2009 |
| JP | 2010-053632 A | 3/2010 |
| JP | 2010-160017 A | 7/2010 |
| JP | 2010-173384 | 8/2010 |
| JP | 2010-0276594 A | 12/2010 |
| JP | 2011-025715 A | 2/2011 |
| JP | 2011-184963 A | 9/2011 |
| JP | 2012-060609 A | 3/2012 |
| JP | 2012-149474 A | 8/2012 |
| JP | 2013-044687 A | 3/2013 |
| WO | WO 02/38895 A1 | 5/2002 |
| WO | WO 2007/010371 A1 | 1/2007 |
| WO | WO 2007/073969 A1 | 7/2007 |
| WO | WO 2012/084111 A1 | 6/2012 |
| WO | WO 2013/072489 A1 | 5/2013 |

OTHER PUBLICATIONS

Combined Search and Examination Report, GB 1309744.9, Nov. 29, 2013, 7 pages.
Combined Search and Examination Report, GB 1409778.6, Nov. 28, 2014, 6 pages.
Notification of Transmittal of the International Search Report and the Written Opinion of the International Searching Authority, or the Declaration, PCT/EP2014/061210, Sep. 2, 2014, 12 pages.
Notification of Transmittal of the International Search Report and the Written Opinion of the International Searching Authority, or the Declaration, PCT/EP2014/061401, Sep. 2, 2014, 14 pages.
Notice of Reasons for Rejection, Japanese Application No. 2016-516177, Jan. 4, 2017.
Notice of Reasons for Rejection, Japanese Patent Application No. 2016-516197, Dec. 6, 2016, 8 pages.
Notification of First Office Action, Chinese Patent Application No. 201480031199.2, Nov. 16, 2016, 21 pages.
Notification of First Office Action, Chinese Patent Application No. 201480031134.8, Nov. 2, 2016, 14 pages.
Notice of Reasons for Refusal, Japanese Application No. 2016-516200, Jan. 4, 2017.
Notice of Reasons for Rejection, Japanese Patent Application No. 2016-516185, Jan. 10, 2017, 6 pages.
Notification of Reasons for Refusal, Japanese Patent Application No. 2016-516178, Jan. 24, 2017, 6 pages.
Combined Search and Examination Report, GB 1309748.0, Dec. 6, 2013, 6 pages.
Combined Search and Examination Report, GB 1409725.7, Dec. 2, 2014, 5 pages.
Examination Report, GB 1309747.2, Jun. 4, 2015, 2 pages.
Examination Report, GB 1309745.6, Jun. 4, 2015, 2 pages.
Examination Report, GB 1309748.0, Oct. 9, 2015, 3 pages.
Notification of Transmittal of the International Search Report and the Written Opinion of the International Searching Authority, or the Declaration, PCT/EP2014/061208, Jul. 16, 2014, 12 pages.
Notification of Transmittal of the International Search Report and the Written Opinion of the International Searching Authority, or the Declaration, PCT/EP2014/061336, Sep. 2, 2014, 14 pages.
Notification of Transmittal of the International Search Report and the Written Opinion of the International Searching Authority, or the Declaration, PCT/EP2014/061252, Aug. 28, 2014, 13 pages.
Search Report, GB 1309745.6, Dec. 4, 2013, 5 pages.
Search Report, GB 1309747.2, Dec. 6, 2013, 4 pages.

* cited by examiner

VEHICLE COMMUNICATION SYSTEM

TECHNICAL FIELD

The present invention relates to a vehicle communication system for facilitating control over vehicle functions. The present invention relates more particularly, but not exclusively, to systems and methods for facilitating control over vehicle functions based, at least in part, on position of a mobile communication unit. Aspects of the invention relate to a system, to a method and to a vehicle.

BACKGROUND OF THE INVENTION

In today's world, many vehicles are equipped with systems for facilitating remotely controlled vehicle functions such as passive entry and passive starting (i.e., PEPS) of a host vehicle. When a vehicle is equipped with a PEPS system, a user carries a mobile communication unit which can communicate with a base station located in the vehicle. To conserve use of energy stored in its internal battery, system components may remain in a low power state until an initiating trigger (for example, manipulation of a vehicle door handle) awakens one or more other system components. For example, upon sensing that a door handle has been manipulated, the base station may emit a relatively powerful Low Frequency (LF) electromagnetic field, causing a mobile communication unit that is sufficiently close to the base station to awaken. Once the mobile communication unit is awake, it may use Radio Frequency (RF) transmissions to dispatch a response signal, which may be validated by the base station. If the base station recognizes and approves the identity of the mobile communication unit, (i.e., the base station authenticates the mobile communication unit), the base station may facilitate the performance of a predefined vehicle function, such as actuating a door lock mechanism, causing the door to become unlocked.

Because the amount of energy required by the base station to generate a LF field is significant, many such systems employ a sleep mode and awaken only upon the occurrence of a trigger event. Unfortunately, the use of an initiating trigger causes the sequence of authenticating the mobile communication unit to be performed within an extremely short amount of time so as to avoid the nuisance of experiencing a delay in the vehicle response. Fast-release motors may be employed to perform the actuation functions such as unlocking a door.

Means may be provided for monitoring movements of the mobile communication unit such that, after a period of time in which the mobile communication unit has remained stationary and has not been otherwise activated, the mobile communication unit would be caused to enter the sleep mode. Unfortunately, when the mobile communication unit is in the vehicle, physical movements of the vehicle may be misinterpreted as movements of the mobile communication unit even though the mobile communication unit may be stationary with respect to the vehicle. Under those circumstances, the misinterpreted vehicle movements may prevent the mobile communication unit from entering the sleep mode whenever the vehicle is moving. The present invention attempts to address or ameliorate at least some of the above problems associated with vehicle communication systems.

SUMMARY OF THE INVENTION

In one aspect, the present invention provides a communication system for facilitating control over a function of a vehicle comprises a base station positioned in the vehicle and a mobile communication unit. The base station comprises a first transmitter for transmitting a signal to the mobile communication unit and a first receiver for receiving a signal from the mobile communication unit. The base station is further configured to cause the mobile communication unit to operate in accordance with a limited-response duty cycle. Thus, the vehicle communication system provides an energy-saving in-vehicle mode without compromising relatively continuous communication between the base station and the mobile communication unit.

The base station may be configured for determining a location of the mobile communication unit relative to the vehicle and may be configured to cause the mobile communication unit to operate in accordance with the limited-response duty cycle in response to a determination that the mobile communication unit is located within the vehicle. Alternatively, the base station may be configured to cause the mobile communication unit to operate in accordance with the limited-response duty cycle in response to a determination that the mobile communication unit is substantially stationary relative to the vehicle. Still further, the base station may be configured to cause the mobile communication unit to operate in accordance with the limited-response duty cycle in response to a determination that the mobile communication unit is located within the vehicle and the mobile communication unit is substantially stationary relative to the vehicle.

In another aspect, the present invention provides a communication system for facilitating control over a function of a vehicle comprising a base station positioned in the vehicle and a mobile communication unit, wherein the base station is configured to cause the mobile communication unit to resume operating in accordance with a high-response duty cycle in response to an occurrence of a predetermined trigger event. The predetermined trigger event may correspond to an opening of a door of the vehicle. In addition, the predetermined trigger event may correspond to a closing of a door of the vehicle. Still further, the predetermined trigger event may correspond to a request to start the engine of the vehicle.

In a further aspect, the invention provides a communication system for facilitating control over a function of a vehicle comprising a base station positioned in the vehicle and a mobile communication unit. The base station comprises a first transmitter for transmitting a polling signal and a first receiver for receiving an authentication signal from the mobile communication unit in response to the polling signal. The base station is further configured to cause the mobile communication unit to operate in accordance with a limited-response duty cycle that comprises a period of inactivity, during which the mobile communication unit is unable to receive a transmission, and a period of activity, during which the mobile communication unit is capable of receiving a transmission. The period of inactivity may be longer in time than the period of activity. The period of inactivity may extend for approximately two seconds before a subsequent period of activity, and the period of activity may extend for approximately three microseconds before a subsequent period of inactivity.

The high-response duty cycle may comprise a period of activity, during which the mobile communication unit is capable of receiving a transmission, and the period of activity may occur without substantial interruption by a period of inactivity. The period of inactivity may not be longer in duration than one second. Alternatively, the period of inactivity may not be longer in duration than one half of one second.

In a further aspect, the base station may be configured for determining a location of the mobile communication unit relative to the vehicle based on a time of flight of communications between the mobile communication unit and one or more transceivers positioned in the vehicle. The base station may also be configured for determining a location of the mobile communication unit relative to the vehicle based on a time of flight of communications between the mobile communication unit and three or more transceivers positioned in the vehicle. Still further, the base station is configured for determining a location of the mobile communication unit relative to the vehicle based on a time of flight of communications between the mobile communication unit and four or more transceivers positioned in the vehicle. Further yet, the base station is configured for determining a location of the mobile communication unit relative to the vehicle based on a time of flight of an ultra-wide band communications between the mobile communication unit and the at least one transceiver positioned in the vehicle.

In a further aspect, the mobile communication unit comprises a motion sensor configured to detect movements of the mobile communication unit and to communicate said movements to the base station. The determination that the mobile communication unit is substantially stationary relative to the vehicle may be made in dependence on the detected movements communicated from the mobile communication unit to the base station.

In a further aspect, a method of facilitating control over a function of a vehicle comprises providing a base station positioned in the vehicle and a mobile communication unit, the base station comprising a first transmitter and a first receiver. A signal is transmitted from the first transmitter to the mobile communication unit, and a signal is received from the mobile communication unit. The mobile communication unit is caused to operate in accordance with a limited-response duty cycle. A location of the mobile communication unit may be determined relative to the vehicle, and the mobile communication unit may be caused to operate in accordance with the limited-response duty cycle in response to a determination that the mobile communication unit is located within the vehicle or in response to a determination that the mobile communication unit is substantially stationary relative to the vehicle or further in response to a determination that the mobile communication unit is located within the vehicle and that the mobile communication unit is substantially stationary relative to the vehicle. The mobile communication unit may be caused to resume operating in accordance with a high-response duty cycle in response to an occurrence of a predetermined trigger event.

A method of facilitating control over a function of a vehicle may further comprise determining a location of the mobile communication unit relative to the vehicle based on a time of flight of communications between the mobile communication unit and one or more transceivers positioned in the vehicle, based on a time of flight of communications between the mobile communication unit and three or more transceivers positioned in the vehicle or based on a time of flight of communications between the mobile communication unit and four or more transceivers positioned in the vehicle.

In another aspect, there is provided a vehicle having a communication system as described in the foregoing aspects which may be adapted to perform a method as described in the preceding aspects.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one embodiment are applicable to all embodiments unless such features are incompatible.

BRIEF DESCRIPTION OF THE DRAWINGS

One or more embodiments of the present invention will now be described, by way of example only, with reference to the accompanying figures, in which.

DETAILED DESCRIPTION

Figure 1:
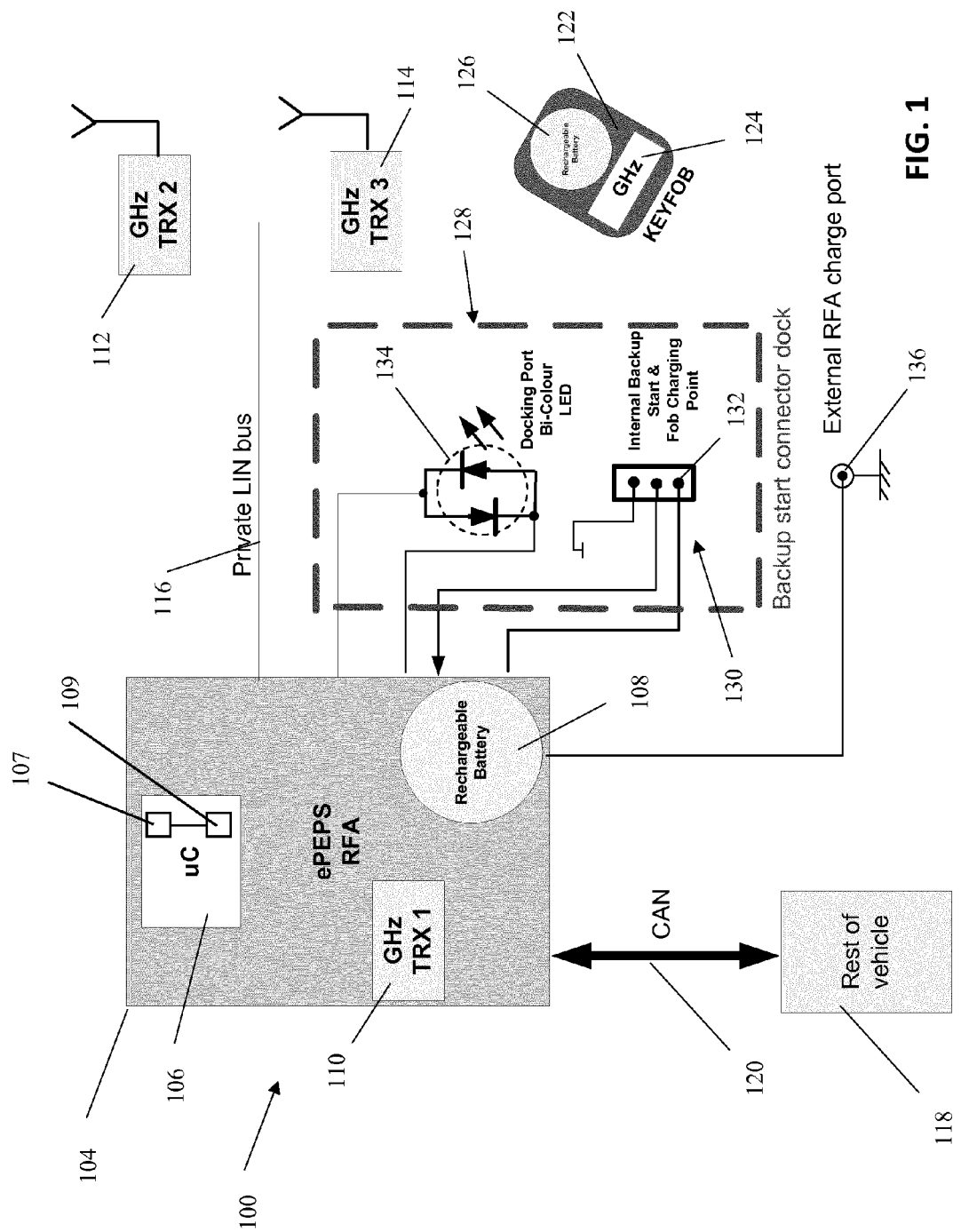
FIG. 1 shows a schematic representation of a vehicle communication system according to an embodiment of the present invention.

FIG. 1 shows a vehicle communication system 100 in accordance with an embodiment of the present invention. The vehicle communication system 100 is configured to facilitate transfer of information among components of the vehicle communication system 100, which may further facilitate control over one or more functions of a vehicle 102. Exemplary functions that may be controlled include, but are not limited to, enhanced Passive Entry and Passive Start (ePEPS) keyless access, remote engine start, remote opening and closing of vehicle apertures, deployment and retraction of external mirrors or antennas, and/or activation and deactivation of lighting and signalling systems of the vehicle 102.

The vehicle communication system 100 will be described with reference to the vehicle 102 which has a front right door 142, a rear right door 144, a front left door 146 and a rear left door 148. The vehicle 102 also has a boot lid 150 (also known as a deck lid) which can be locked/unlocked by the vehicle communication system 100 but this is not described herein for the sake of brevity. The doors 142-148 each have a lock mechanism and an external handle; and the front doors 142, 146 each have a folding door mirror. The lock mechanisms each comprise a door lock switch to provide a locking signal to indicate the status of the respective lock mechanism.

The vehicle communication system 100 comprises a base station 104 to be installed in the vehicle 102 to provide a Remote Function Actuator (RFA) for the vehicle 102. The base station 104 comprises an electronic control unit 106, and a first rechargeable battery 108. The electronic control unit 106 comprises a memory storage device 107 that is in communication with one or more processor 109. The processor(s) 109 can be configured to perform computational instructions stored in the memory storage device 107. The first rechargeable battery 108 provides a dedicated power supply for the base station 104 to enable its operation independently from a vehicle power system (not shown).

The base station 104 further comprises first, second and third ultra-wideband transceivers 110, 112, 114. The first transceiver 110 is provided proximal the electronic control unit 106. The second and third transceivers 112, 114 are positioned in the vehicle 102 remote from the electronic control unit 106 and connected via a dedicated local interconnect network (LIN) 116. The transceivers 110, 112, 114 each have an integrated antenna.

The base station 104 is connected to the vehicle systems (denoted generally by the reference numeral 118) via a CAN bus 120. The base station 104 can thereby receive signals from the vehicle systems (e.g., locking signals from door lock switches); and can control operation of one or more vehicle systems (e.g., door lock mechanisms, closure systems for vehicle apertures such as windows, sun roof, ventilation systems, deck lid, engine start/ignition, vehicle lighting, entertainment systems, horn, heater, air conditioning, and the like). The CAN bus 120 can also be employed to convey instructions from the electronic control unit 106 to the engine control unit to enable/disable one or more vehicle systems (e.g., passive engine starting).

The vehicle communication system 100 further comprises a mobile communication unit 122 having a remote ultra-wideband transceiver 124 and a second rechargeable battery 126. The mobile communication unit 122 is portable to facilitate its being carried by the user. As described herein, the mobile communication unit 122 communicates with the base station 104 to facilitate control over vehicle functions, such as passive entry to the vehicle 102, and, under some circumstances, to provide information to a user in possession of the mobile communication unit 122.

The base station 104 further comprises a dock 128 for receiving the mobile communication unit 122. The dock 128 has a port 130 to enable communication between the base station 104 and the mobile communication unit 122. A charging pad 132 is also provided in the dock 128 to facilitate charging of the second rechargeable battery 126 when the mobile communication unit 122 is docked and thus mated with the charging pad 132. A bi-colour light emitting diode 134 is provided in the dock 128 to indicate the status of the mobile communication unit 122 (for example to indicate that the second rechargeable battery 126 is charging or is fully charged). The charging pad 132 is connected to a power supply unit (PSU) provided in the base station 104. An external charge port 136 for the base station 104 is provided for charging the first rechargeable battery 108.

Figure 2:
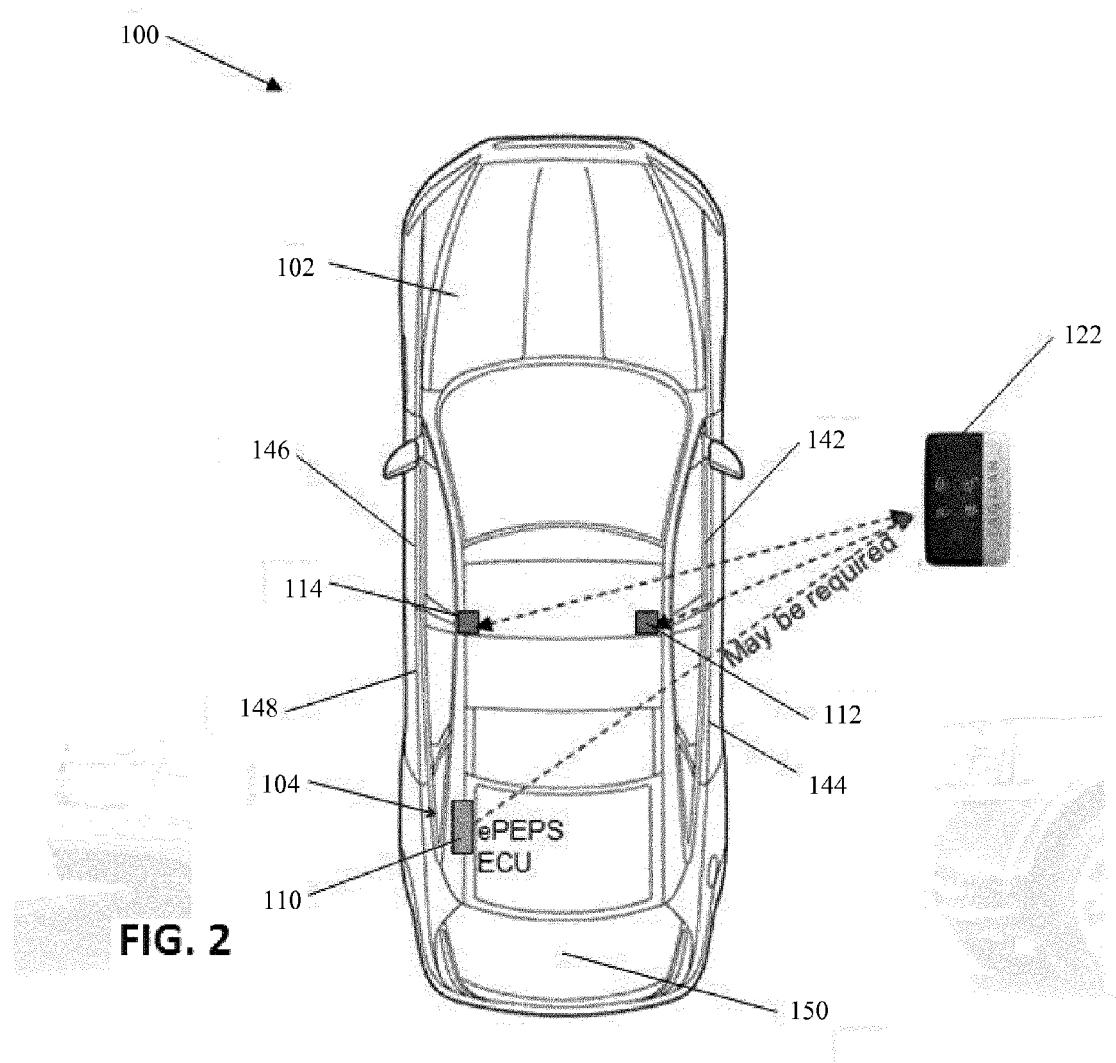
FIG. 2 shows the installation of the base station and transceivers of the vehicle communication system according to one embodiment of the present invention in a motor vehicle.

The installation of the vehicle communication system 100 is illustrated in FIG. 2. The base station 104 and the first transceiver 110 are located at the rear of the vehicle 102 and the second and third transceivers 112, 114 are located in the upper part of the vehicle 102 (typically in the roof) on the right and left sides respectively of the vehicle 102. As illustrated by dashed lines in FIG. 2, the transceivers 110, 112, 114 communicate with the mobile communication unit 122. The distance from each of the first, second and third transceivers 110, 112, 114 to the remote transceiver 124 can be determined by measuring transmission and/or response time (for example, time of flight for a signal transmission) thereby allowing the position of the mobile communication unit 122 in relation to the vehicle 102 to be determined through triangulation. The use of ultra-wideband frequencies (typically greater than 3 GHz) allows the position of the mobile communication unit 122 to be tracked with a relatively high degree of accuracy.

In accordance with such an embodiment of the vehicle communication system 100, wherein the base station 104 comprises three transceivers 110, 112, 114 disposed at spaced apart locations within the vehicle 102, it is possible to use the transmission and/or response times for communications sent between the mobile communication unit 122 and each of the transceivers 110, 112, 114 to determine the position of the mobile communication unit 122 relative to the vehicle 102 along each of two axes. For example, with the base station 104 and the first transceiver 110 located toward the rear of the vehicle 102 and the second and third transceivers 112, 114 disposed within the roof (on respective left and right sides), the position of the mobile communication unit 122 in a horizontal plane around the vehicle 102 can readily be determined, i.e. as shown in the plan view of FIGS. 2 to 6.

However, with the second and third transceivers 112, 114 disposed in the vehicle roof, and therefore lying in the same horizontal plane, there may be situations in which it is not possible to readily determine the position of the mobile communication unit 122 along a direction normal to the plan views of FIGS. 2 to 6. Accordingly, in a further embodiment of the invention, the vehicle communication system 100 may comprise a fourth transceiver (not shown) which is disposed within the vehicle 102 at a location which is spaced apart in a vertical direction from both the plane of the vehicle roof and the horizontal plane in which the base station 104 lies. For example, the fourth transceiver (not shown) could be mounted in the vehicle dashboard on the vehicle centre line. With this configuration, the height of the mobile communication unit 122 relative to the vehicle 102 can readily be determined.

Thus, a position of the mobile communication unit 122 relative to the vehicle 102 may be periodically or continuously determined and may be saved in the memory storage device 107 for subsequent retrieval and analyses by the processor 109. Such monitoring and storing and processing of position information may be useful for observing, tracking, and identifying certain rates, patterns, and/or characteristics of movement. For example, the vehicle communication system 100 may be configured to detect the presence of the mobile communication unit 122 inside the passenger compartment of the vehicle 102.

The remote transceiver 124 transmits a polling signal which, when received by the first transceiver 110 of the base station 104, initiates communication between the base station 104 and the mobile communication unit 122. In one embodiment, upon receipt of the polling signal, the first transceiver 110 responds by transmitting a challenge signal. The challenge signal is received by the mobile communication unit 122 and prompts the transmission of a response signal. The electronic control unit 106 validates the response signal.

If the response signal is authenticated, the electronic control unit 106 continues to communicate with the mobile communication unit 122 and tracks its position in relation to the vehicle 102 and may store the position information in a the memory storage device 107 for retrieval and processing by the processor 109 in accordance with pre-defined instructions.

Moreover, provided the challenge/response sequence is completed successfully, the electronic control unit 106 will provide control over functions of the vehicle 102 subject to operating criteria being satisfied. If the response signal is not authenticated, the electronic control unit 106 will not facilitate user control over vehicle functions, such as unlocking the doors of vehicle 102 or starting the engine of vehicle 102.

In one mode of operation, the polling signal is transmitted continually by the remote transceiver 124 so that communication with the base station 104 is initiated by the mobile communication unit 122. Accordingly, the vehicle communication system 100 can initiate a challenge/response cycle without the need for user interaction, such as actuating a door handle.

In another mode of operation, such as may be active upon first entry of the vehicle 102 into service, to conserve energy stored in the second rechargeable battery 126, the polling signal is transmitted for an operating period of thirty (30) days. The transmission of the polling signal is stopped if the mobile communication unit 122 does not establish communication with the base station 104 during the operating period. A button provided on the mobile communication unit 122 can be pressed to re-commence transmission of the polling signal after said operating period has expired.

In another embodiment, the polling signal is transmitted intermittently, rather than continuously. In accordance with this embodiment, the polling signal is repeated during the operating period with a time interval between transmission cycles (pulses), i.e. the polling signal is transmitted continually during the operating period. The time interval between the transmission cycles can be modified in response to measured parameters. For example, the time interval between transmissions can be modified depending on the measured distance between the vehicle 102 and the mobile communication unit 122. If the mobile communication unit 122 is close to the vehicle 102, the time interval can be reduced to one (1) second. Conversely, if the mobile communication unit 122 is relatively far away from the vehicle 102, the time interval can be increased to five (5) seconds, for example.

The base station 104 and the mobile communication unit 122 can communicate with each other over a range of at least 20 meters and an authorization zone 138 having a radius of 2 meters is defined around the vehicle 102. When the electronic control unit 106 determines that the mobile communication unit 122 is inside the authorization zone 138 it automatically unlocks one or more of the vehicle's doors 142-49. Conversely, when the electronic control unit 106 determines that the mobile communication unit 122 is outside the authorization zone 138, it automatically locks the vehicle's doors 142-148.

As discussed above, a vehicle communication system 100 comprising three or fewer transceivers may be able to determine a position of the mobile communication unit 122 relative to the vehicle 102 along only two axes. Accordingly, the authorization zone 138 may be defined in terms of only those two axes. A vehicle communication system 100 comprising four or more transceivers, however, may be able to determine a position of the mobile communication unit 122 relative to the vehicle 102 along any combination of three (optionally orthogonal) axes. Accordingly, the location of the authorization zone 138 may be defined in terms positions along each the three axes, such that the authorization zone 138 (and thus the set of locations that are outside the authorization zone 138) may be defined in terms of three-dimensional space relative to the vehicle 102.

Being able to accurately determine the position of the mobile communication unit 122 in a three-dimension space around the vehicle 102 may be particularly useful in certain situations, for example when the vehicle 102 is parked in a multi-level or multi-story car park or adjacent to a multi-story building. In such situations it is possible that the driver, having exited the vehicle 102 may move to another level of the car park or building above or below the vehicle 102, but still be close enough to the vehicle 102 to be within the authorization zone 138, resulting in one or more of the vehicle doors being unlocked.

Accordingly, if it is determined that the mobile communication unit 122 is disposed sufficiently above or below the vehicle 102, such as in the example of the multi-level car park, the electronic control unit 106 may not unlock the vehicle doors even when the mobile communication unit 122 would otherwise be judged to be within the authorization zone 138.

The electronic control unit 106 may be configured to operate the vehicle communication system 100 according to a number of operating modes. In a number of scenarios, the mobile communication unit 122 is carried on the person of the user and therefore follows the movements of the user. Movements of the user, and therefore, the mobile communication unit 122, are illustrated by a set of footprints 140. The process performed by the base station 104 for authenticating the mobile communication unit 122 is the same as described above and is common to each of the operating modes. In particular, the remote transceiver 124 transmits a polling signal which initiates an authentication cycle with the first transceiver 110. The base station 104 transmits a challenge signal which triggers transmission of a response signal from the mobile communication unit 122. The electronic control unit 106 validates the response signal and, if successful, the base station 104 tracks the range and position of the authenticated mobile communication unit 122. If the authentication cycle is not successfully completed, for example due to an incorrect response signal being sent from the mobile communication unit 122, the doors 142-148 will not be unlocked and the vehicle 102 will not respond to the mobile communication unit 122.

Figure 3:
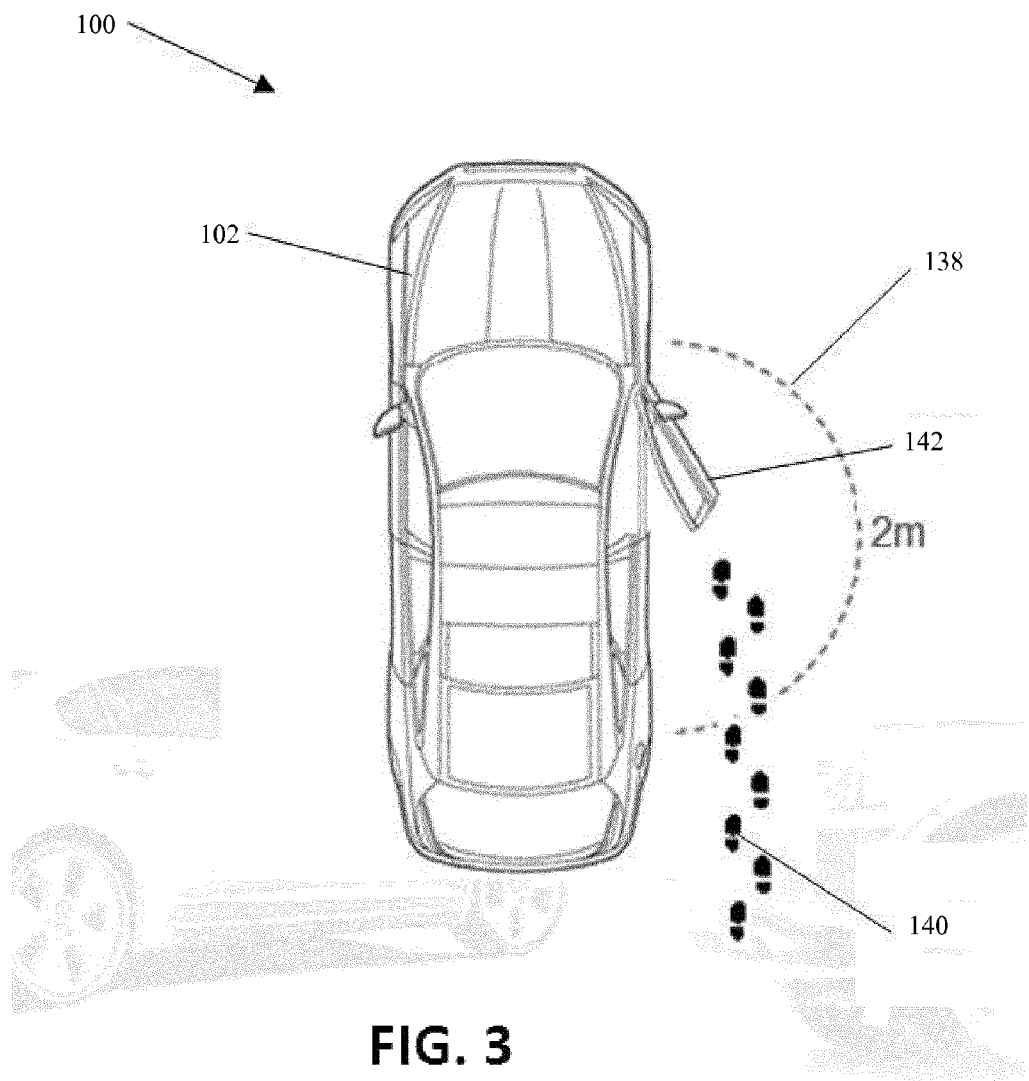
FIG. 3 shows an operating mode of the vehicle communication system according to one embodiment of the present invention.

The electronic control unit 106 may be configured to operate the vehicle communication system 100 according to a first operating mode as illustrated in FIG. 3. In this operating mode, the vehicle communication system 100 operates to unlock the doors 142-148 on the side of the vehicle 102 on which the user approaches with the mobile communication unit 122. Having authenticated the mobile communication unit 122 the base station 104 tracks its range and position. In the illustrated example, the electronic control unit 106 determines that the mobile communication unit 122 is on the right hand side of the vehicle 102. Once the base station 104 determines that the mobile communication unit 122 is within the authorization zone 138, the electronic control unit 106 automatically generates a door unlock signal to unlock both doors 142, 144 on the right hand side of the vehicle 102. The door unlock signal is transmitted via the CAN bus 120 and the front right door 142 and the rear right door 144 are unlocked when the mobile communication unit 122 enters the authorization zone 138. As the doors 142, 144 are unlocked before the user operates the respective door handle, in normal operating conditions it is envisaged that there would be no perceptible delay when the user operates the door handle.

In this mode, when the user operates the door handle on either the front right door 142 or the rear right door 144, either a single-point entry (SPE) or a multiple-point entry (MPE) can be initiated. In single-point entry mode, when the drivers door is the only opened door and the key fob is taken into the vehicle, the rear door on the approached side will be re-locked. For the avoidance of doubt, the drivers door does not have to be closed to effect the locking of the rear door. If ANY door other than driver's door is opened, then all doors will be unlocked and remain so. The action of locking the rear door on the driver's side is caused by the key fob being detected inside the vehicle and thus no longer seen in the authorisation zone on the outside of the vehicle. In a multiple-point entry, the electronic control unit 106 generates control signals to unlock all of the other doors in the vehicle 102 when the door handle of either the front right door 142 or the rear right door 144 is operated. It will be appreciated that the front left door 146 and the rear left door 148 will be unlocked if base station 104 determines that the mobile communication unit 122 enters the authorization zone 138 on the left hand side of the vehicle 102. Only when the door handle of one of the unlocked doors 142-148 is operated is an indication provided that the doors have been unlocked, for example by flashing the side repeaters and/or extending the door mirrors. If none of the door handles are operated, no indication is provided that one or more of the doors 142-148 have been unlocked.

Figure 4:
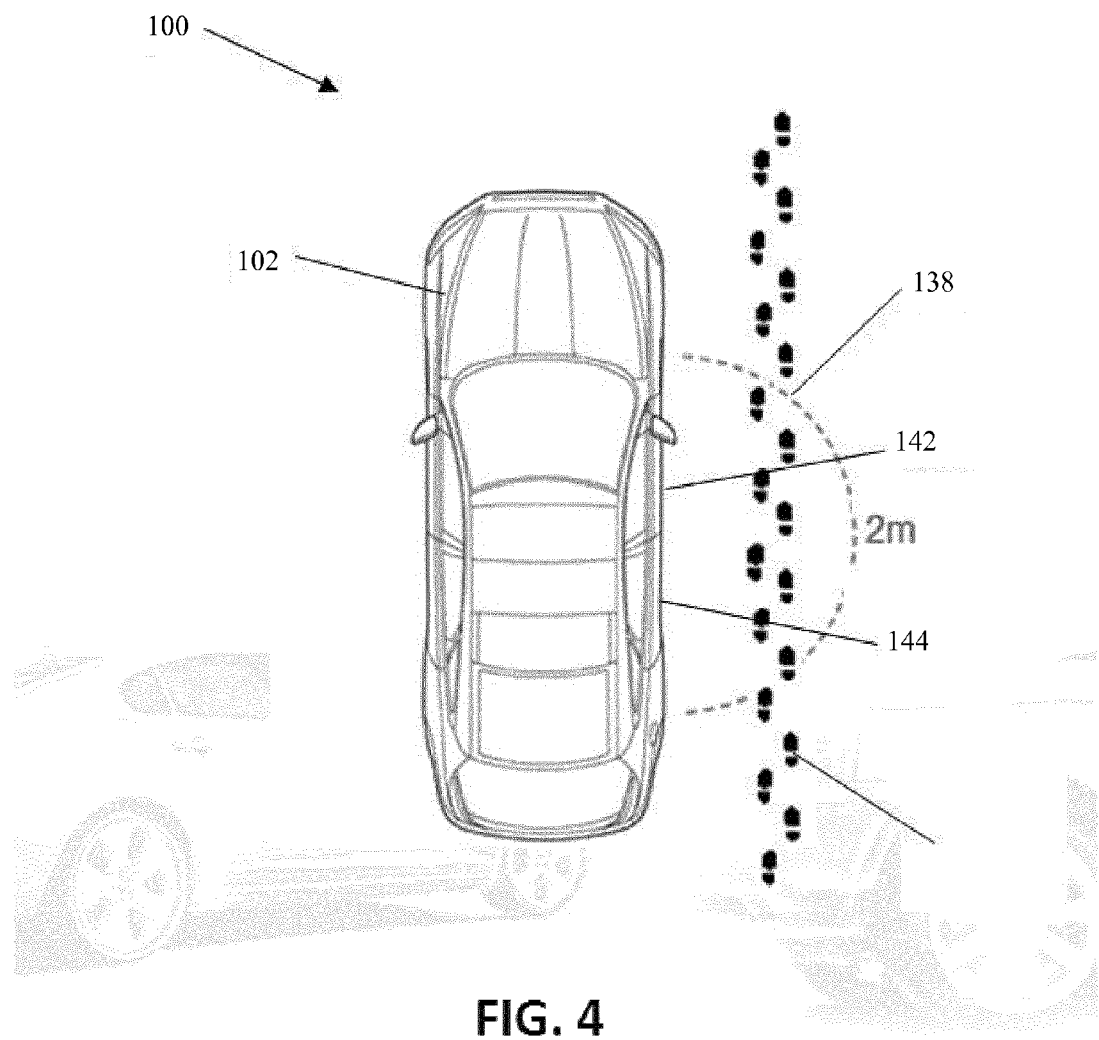
FIG. 4 illustrates another operating mode of the vehicle communication system according to one embodiment of the present invention.

The electronic control unit 106 may be configured to operate the vehicle communication system 100 according to a second operating mode as illustrated in FIG. 4 to accommodate a walk-past scenario. In this walk-past scenario, the user enters and exits the authorization zone 138 but does not operate a door handle. As in the first mode described above, the base station 104 authenticates the mobile communication unit 122 as it approaches the vehicle 102. In this case, the base station 104 tracks the position of the mobile communication unit 122 and determines that the user is approaching from the rear of the vehicle 102 on the right hand side. As described above in regard to the first mode of operation, when the vehicle communication system 100 detects that the mobile communication unit 122 has entered the authorization zone 138, as it has in this walk-past scenario, a door unlock signal is transmitted to unlock the front right door 142 and the rear right door 144.

In this scenario, however, the user does not operate the door handle on either of the doors 142, 144 and, instead, walks past the vehicle 102. Since the vehicle communication system 100 is tracking the position of the mobile communication unit 122, the vehicle communication system 100 is able to determine when the mobile communication unit 122 leaves the authorization zone 138. Accordingly, upon the departure of the mobile communication unit 122 from the authorization zone 138, and lacking the receipt of any indication that a door handle has been operated, the base station 104 transmits a door lock signal to lock the front right door 142 and the rear right hand door 144 or otherwise facilitates the re-locking of those doors. In one embodiment, the vehicle 102 does not provide a visual indication when the doors 142, 144 are unlocked or subsequently locked.

Figure 5:
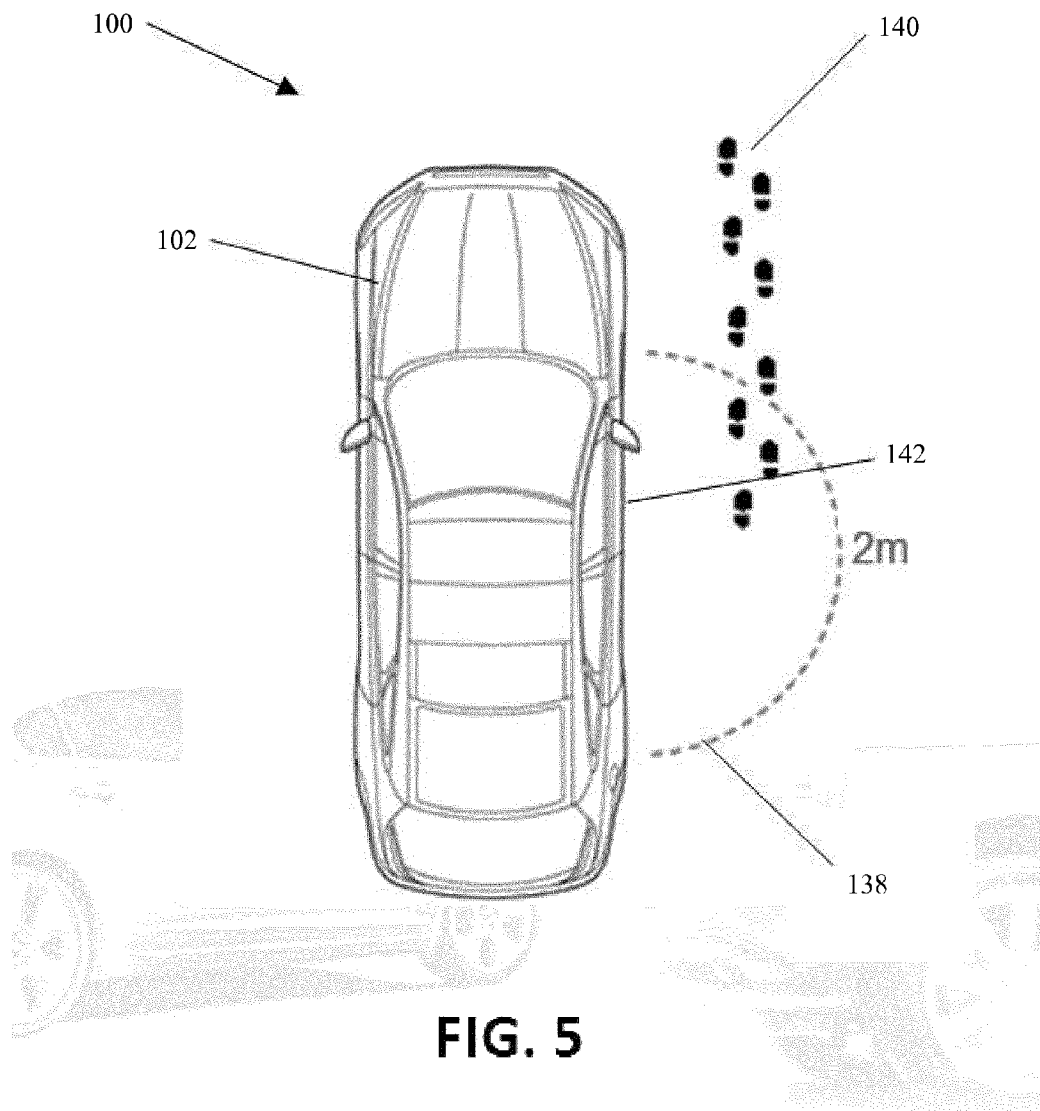
FIG. 5 illustrates another operating mode of the vehicle communication system according to one embodiment of the present invention.

The electronic control unit 106 may be configured to operate the vehicle communication system 100 according to a third operating mode as illustrated in FIG. 5 to facilitate the automatic locking of the doors 142-148 when the user walks away from the vehicle 102. In this scenario, the user exits the vehicle 102 carrying the mobile communication unit 122 and closes the vehicle doors 142-148. In the illustrated example, the user exits the vehicle 102 through the front right door 142 and then closes it. The user then walks away from the vehicle 102 carrying the mobile communication unit 122. As the mobile communication unit 122 is carried away from the vehicle 102, the vehicle communication system 100 tracks the location of the mobile communication unit 122 and compares that location to the definition of the authorization zone 138. If and when the vehicle communication system 100 determines that the mobile communication unit 122 has left the authorization zone 138, the vehicle communication system 100 transmits a door lock signal to lock the doors 142-148. The vehicle 102 is thereby secured automatically without the user activating the mobile communication unit 122 or taking any action other than walking away from the vehicle 102. A security protocol to comply with industry standards, for example those specified by Thatcham®, would typically be undertaken for the automatic locking of the doors 142-148. Under normal operating conditions, the automatic locking of the vehicle 102 does not double-lock the vehicle 102. Rather, the vehicle 102 would only be double-locked if the user specifically selected this locking mode, for example via a control panel in the vehicle 102.

Figure 6:
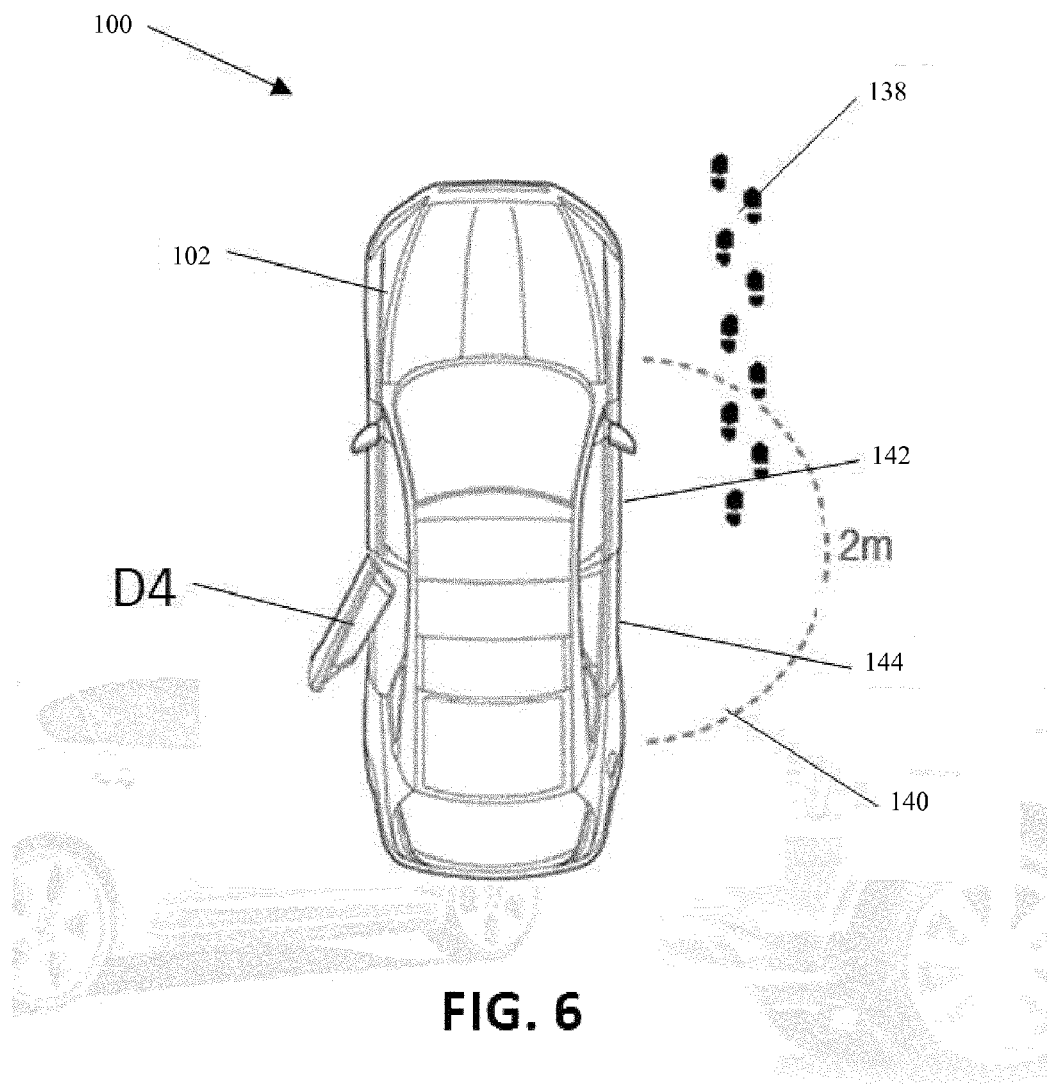
FIG. 6 illustrates another operating mode of the vehicle communication system according to one embodiment of the present invention.

The electronic control unit 106 may be further configured to operate the vehicle communication system 100 according to a fourth operating mode as illustrated in FIG. 6 to accommodate a mis-lock scenario. This mode is similar to the third operating mode described above insofar as the user exits the vehicle 102 through the front right door 142 and closes the door 142 before walking away from the vehicle 102. In connection with this fourth operating mode, the vehicle communication system 100 again determines if and when the mobile communication unit 122 has departed the authorization zone 138. As illustrated in FIG. 6, however, the rear left door 148 is ajar, and the electronic control unit 106 determines that the door 148 cannot be locked (a so-called mis-lock).

To avoid the user leaving the vehicle 102 in an unsecure state (as may otherwise occur if the operator had not noticed that the rear left door 148 was ajar) the electronic control unit 106 transmits an alert signal to the CAN bus 120 and a notification is provided to the user. For example, the CAN bus 120 may illuminate the side repeaters and/or provide an audible warning to notify the user that the doors 142-148 have not all been locked. When the rear left door 148 is closed, the vehicle communication system 100 will lock the door 148 to secure the vehicle 102.

In conjunction with the above-described modes of operation, the electronic control unit 106 may be configured to operate the vehicle communication system 100 according to a fifth operating mode, accommodating an in-vehicle scenario. In order to conserve energy stored in the second rechargeable battery 126 of the mobile communication unit 122, it may be desirable, in certain situations, for one or more components of the vehicle communication system 100, such as the mobile communication unit 122, to operate in a modified, energy-conserving manner. For example, when the mobile communication unit 122 has remained substantially stationary relative to the vehicle 102 for greater than a predetermined period of time, and remains in a location within the vehicle 102, it may be determined that the likelihood of an immediate and urgent need for two-way communication involving the mobile communication unit 122 may be relatively low. Accordingly, the base station 104 may instruct the mobile communication unit 122 to enter a driving mode.

In such a driving mode, in response to a command received from the base station 104, the transceiver 124 of the mobile communication unit 122 is caused to perform according to a modified, limited-response duty cycle. While the vehicle communication system 100 is operating in a mode that requires relatively immediate response from the mobile communication unit 122, the transceiver 124 of the mobile communication unit 122 operates according to a high-response duty cycle such that the transceiver 124 remains substantially active at all times, with relatively little or no periods of inactivity. Accordingly, relatively little time lag exists between a transmission of a command signal from the first transceiver 110 and a transmission of a response from the mobile communication unit 122. When the mobile communication unit 122 performs according to the modified, limited-response, duty cycle, however, the transceiver 124 of the mobile communication unit 122 remains substantially inactive for the majority of each cycle, with relatively little time of activity within each cycle. Therefore, a relatively greater time lag exists between transmission of a command signal from the first transceiver 110 and the transmission of a response from the mobile communication unit 122.

Accordingly, a high-response duty cycle comprises an active phase that occurs without substantial interruption by an inactive phase. A limited-response duty cycle comprises active phases that are interrupted by periods on inactivity. In one such embodiment, a period of inactivity may extend for approximately two seconds, during which time the transceiver 124 is in an inactive state and therefore unable to receive a transmission, such as a command signal transmitted by the base station 104. In each active phase occurring between the periods of inactivity, the transceiver 124 of the mobile communication unit 122 is activated for a few microseconds (e.g., between approximately one microsecond and approximately ten microseconds, for approximately three microseconds). During these intervening active periods, the transceiver 124 is capable of receiving transmissions, including command, polling or challenge signals or other information transmitted by the base station 104. During extended time periods of driving, the mobile communication unit 122 performs this modified, limited-response, duty cycle, continuously alternating between the longer periods of deactivation and the relatively brief periods of activation. Thus, in accordance with this modified duty cycle, energy consumption by the mobile communication unit 122 may be substantially reduced.

In the event that it becomes necessary or useful to resume two-way communications between the base station 104 and the mobile communication unit 122, the base station 104 transmits a continuous wake-up transmission pulse lasting for at least as long as the length of each period of deactivation. Accordingly, as soon as the mobile communication unit 122 enters an active phase in its duty cycle, the mobile communication unit 122 encounters the wake-up transmission pulse. Upon receiving the wake-up transmission pulse, the mobile transmitter-receiver would take the appropriate action depending on what the base station 104 commands the mobile communication unit 122 to do.

A number of scenarios may arise wherein it may be desirable for the base station 104 to resume communications with the 122 during the driving mode. For example, whenever a door is opened and closed, it may be necessary to perform a search for the presence of a mobile communication unit 122 within the passenger compartment of the vehicle 102. If there is no mobile communication unit 122 present, the base station 104 may alert the driver and/or disable certain features and functions of the vehicle, in particular to disable the engine or immobilise the vehicle. To facilitate the search, a wake-up command is issued by the base station 104 whenever a door is opened. Thus, the vehicle communication system 100 provides an energy-saving in-vehicle mode without compromising relatively continuous communication between the base station 104 and the mobile communication unit 122.

The vehicle communication system 100 can optionally also provide keyless engine starting for the vehicle 102. By using the ranging data from the transceivers 110, 112, 114, the electronic control unit 106 can determine when the mobile communication unit 122 is inside the vehicle 102. A control signal can be transmitted to the engine control unit, via the CAN bus 120, to permit keyless engine starting when a Start button is pressed.

The vehicle communication system 100 according to the present invention can be further refined. In particular, the electronic control unit 106 can be configured to transmit a status signal to the mobile communication unit 122. For example, if the base station 104 detects a mis-lock scenario, the status signal may instruct the mobile communication unit 122 to generate a first user alert. Equally, the status signal may instruct the mobile communication unit 122 to generate a second user alert (which is different from the first user alert) when the vehicle 102 has been locked. The first and/or the second user alert could be provided instead of, or in addition to, any notification provided by the vehicle 102. The mobile communication unit 122 could comprise an audio, optical or haptic output for indicating the vehicle status. For example, the mobile communication unit 122 could comprise one or more of the following: LED(s), a text screen or a vibrating mechanism.

The mobile communication unit 122 is also provided with one or more buttons to allow a user to trigger locking/unlocking of the vehicle doors from outside of the authorization zone 138.

The ultra-wideband (UWB) transceivers 110, 112, 114, 124 described herein are compliant with IEEE802.15.4a protocol.

The vehicle communication system 100 can monitor time of flight (ToF) communications between the base station 104 and the mobile communication unit 122 to provide improved security, for example to protect against a relay-station security attack.

A door unlock override switch can be provided to unlock the doors 142-148 in the event of an emergency.

The skilled person will understand that various changes and modifications can be made to the vehicle communication system 100 described herein without departing from the spirit and scope of the present invention. For example, a welcome lights function could be supported by illuminating an interior and/or exterior vehicle light when the mobile communication unit 122 enters the authorization zone 138.

Although the vehicle communication system 100 has been described with reference to the mobile communication unit 122 transmitting the polling signal, the system could also operate if the base station 104 transmitted the polling signal. For example, the first transceiver 110 of the base station 104 may transmit a polling signal which, when received by the remote transceiver 124, initiates communication between the mobile communication unit 122 and the base station 104. In one embodiment, upon receipt of the polling signal, the mobile communication unit responds by transmitting a response signal. The response signal is received by the first transceiver 110, and the electronic control unit 106 validates the response signal.

The mobile communication unit 122 may include a motion sensor 152, such as a gyroscope or an accelerometer, to detect movements of the mobile communication unit 122. Signals based on the detected movements may then be transmitted to the base station 104 for use in deciding whether, when and how to facilitate control over vehicle functions. For example, if the base station 104 determines that the mobile communication unit 122 has been stationary for a predetermined period of time, the base station 104 may cause the mobile communication unit 122 to be disabled or to enter a sleep mode. Alternatively, when the vehicle communication system is operating according to the aforementioned fifth operating mode and the mobile communication unit 122 has remained substantially stationary relative to the vehicle 102 for greater than a predetermined period in a location within the vehicle, the base station 104 shall instruct the mobile communication unit 122 to enter the driving mode. In addition, the base station 104 could transmit a disable signal to deactivate the transceivers 110, 112, 114, 124. Alternatively, the transceivers 110, 112, 114, 124 could be disabled automatically if they do not receive an authorization signal for a predetermined period of time. The mobile communication unit 122 could be awakened by an activation signal from the motion sensor 152 when it detects movement.

Moreover, it will be appreciated that it is not necessary for a vehicle communication system 100 according to the present invention to provide all of the operating modes described herein. Rather, one or more of the operating modes could be embodied in a communication system in accordance with the present invention.

It will be appreciated that various changes and modifications can be made to the present invention without departing from the present invention. Further aspects of the present invention will be understood with reference to the following numbered paragraphs.

1. A communication system for facilitating control over a function of a vehicle (102), the communication system comprising:
   a base station (104) positioned in the vehicle (102); and
   a mobile communication unit (122);
   the base station (104) comprising a first transmitter for transmitting a signal to the mobile communication unit (122) and a first receiver for receiving a signal from the mobile communication unit (122);
   the base station (104) being further configured to cause the mobile communication unit (122) to operate in accordance with a limited-response duty cycle.

2. A communication system as described in paragraph 1, wherein the base station (104) is configured for determining a location of the mobile communication unit (122) relative to the vehicle (102).

3. A communication system as described in paragraph 1 or 2, wherein the base station (104) is configured to cause the mobile communication unit (122) to operate in accordance with the limited-response duty cycle in response to a determination that the mobile communication unit (122) is located within the vehicle (102).

4. A communication system as described in paragraph 2, wherein the base station (104) is configured to cause the mobile communication unit (122) to operate in accordance with the limited-response duty cycle in response to a determination that the mobile communication unit (122) is substantially stationary relative to the vehicle (102).

5. A communication system as described in paragraph 2, wherein the base station (104) is configured to cause the mobile communication unit (122) to operate in accordance with the limited-response duty cycle in response to a determination that the mobile communication unit (122) is located within the vehicle (102) and the mobile communication unit (122) is substantially stationary relative to the vehicle (102).

6. A communication system as described in paragraph 2, wherein the base station (104) is configured to cause the mobile communication unit (122) to resume operating in accordance with a high-response duty cycle in response to an occurrence of a predetermined trigger event.

7. A communication system as described in paragraph 6, wherein the predetermined trigger event is based at least in part upon an opening of a door (142) of the vehicle (102).

8. A communication system as in paragraph 6, wherein the predetermined trigger event is based at least in part upon a closing of a door (142) of the vehicle (102).

9. A communication system as in paragraph 6, wherein the predetermined trigger event is based at least in part upon a request to start an engine of the vehicle (102).

10. A communication system as described in paragraph 1, wherein the limited-response duty cycle comprises a period of inactivity, during which the mobile communication unit (122) is unable to receive a transmission, and a period of activity, during which the mobile communication unit (122) is capable of receiving a transmission.

11. A communication system as described in paragraph 10, wherein the period of inactivity is longer in time than a period of activity.

12. A communication system as described in paragraph 10, wherein a period of inactivity extends for approximately two seconds before a subsequent period of activity.

13. A communication system as described in paragraph 10, wherein a period of activity extends for approximately three microseconds before a subsequent period of inactivity.

14. A communication system as described in paragraph 6, wherein the high-response duty cycle comprises a period of activity, during which the mobile communication unit (122) is capable of receiving a transmission.

15. A communication system as described in paragraph 14, wherein the period of activity occurs without substantial interruption by a period of inactivity.

16. A communication system as described in paragraph 15, wherein the period of inactivity is not longer in duration than one second.

17. A communication system as described in paragraph 15, wherein the period of inactivity is not longer in duration than one half of one second.

18. A communication system as described in paragraph 2, wherein the base station (104) is configured for determining a location of the mobile communication unit (122) relative to the vehicle (102) based on a time of flight of communications between the mobile communication unit (122) and one or more transceivers (110) positioned in the vehicle (102).

19. A communication system as described in paragraph 18, wherein the base station (104) is configured for determining a location of the mobile communication unit (122) relative to the vehicle (102) based on a time of flight of communications between the mobile communication unit (122) and three or more transceivers (110) positioned in the vehicle (102).

20. A communication system as described in paragraph 19, wherein the base station (104) is configured for determining a location of the mobile communication unit (122) relative to the vehicle (102) based on a time of flight of communications between the mobile communication unit (122) and four or more transceivers (110) positioned in the vehicle (102).

21. A communication system as described in paragraph 18 wherein the base station (104) is configured for determining a location of the mobile communication unit (122) relative to the vehicle (102) based on a time of flight of an ultra-wide band communications between the mobile communication unit (122) and the at least one transceiver (124) positioned in the vehicle (102).

22. A communication system as described in paragraph 1, the mobile communication unit (122) comprising a motion sensor (152) configured to detect movements of the mobile communication unit (122) and to communicate said movements to the base station (104).

23. A communication system as described in paragraph 22 when directly or indirectly dependent on claim 4 wherein the determination that the mobile communication unit (122) is substantially stationary relative to the vehicle (102) is made in dependence on the detected movements communicated from the mobile communication unit (122) to the base station (104).

24. A method of facilitating control over a function of a vehicle (102) comprising:
    providing a base station (104) positioned in the vehicle (102) and a mobile communication unit (122), the base station (104) comprising a first transmitter and a first receiver;
    transmitting a signal from the first transmitter to the mobile communication unit (122);
    receiving a signal from the mobile communication unit (122); and
    causing the mobile communication unit (122) to operate in accordance with a limited-response duty cycle.

25. A method of facilitating control over a function of a vehicle (102) as described in paragraph 24, further comprising determining a location of the mobile communication unit (122) relative to the vehicle (102).

26. A method of facilitating control over a function of a vehicle (102) as described in paragraph 25, further comprising causing the mobile communication unit (122) to operate in accordance with the limited-response duty cycle in response to a determination that the mobile communication unit (122) is located within the vehicle (102).

27. A method of facilitating control over a function of a vehicle (102) as described in paragraph 25, further comprising causing the mobile communication unit (122) to operate in accordance with the limited-response duty cycle in response to a determination that the mobile communication unit (122) is substantially stationary relative to the vehicle (102).

28. A method of facilitating control over a function of a vehicle (102) as described in paragraph 25, further comprising causing the mobile communication unit (122) to operate in accordance with the limited-response duty cycle in response to a determination that the mobile communication unit (122) is located within the vehicle (102) and the mobile communication unit (122) is substantially stationary relative to the vehicle (102).

29. A method of facilitating control over a function of a vehicle (102) as described in paragraph 25, further comprising causing the mobile communication unit (122) to resume operating in accordance with a high-response duty cycle in response to an occurrence of a predetermined trigger event.

30. A method of facilitating control over a function of a vehicle (102) as described in paragraph 24, further comprising determining a location of the mobile communication unit (122) relative to the vehicle (102) based on a time of flight of communications between the mobile communication unit (122) and one or more transceivers (110) positioned in the vehicle (102).

31. A method of facilitating control over a function of a vehicle (102) as described in paragraph 24, further comprising determining a location of the mobile communication unit (122) relative to the vehicle (102) based on a time of flight of communications between the mobile communication unit (122) and three or more transceivers (110) positioned in the vehicle (102).

32. A method of facilitating control over a function of a vehicle (102) as described in paragraph 24, further comprising determining a location of the mobile communication unit (122) relative to the vehicle (102) based on a time of flight of communications between the mobile communication unit (122) and four or more transceivers (110) positioned in the vehicle (102).

33. A vehicle (102) having a communication system, or being adapted to perform a method as described in paragraph 1 or 24.

Unless precluded by incompatibility, each of the claims set out below may be dependent on any preceding claim.

The invention claimed is:

1. A communication system for facilitating control over a function of a vehicle, the communication system comprising:
    a base station positioned in the vehicle; and
    a mobile communication unit;
    the base station comprising a first transmitter for transmitting a signal to the mobile communication unit and a first receiver for receiving a signal from the mobile communication unit;
    the base station being further configured to cause the mobile communication unit to operate in accordance with a limited-response duty cycle, wherein the base station is configured to cause the mobile communication unit to operate in accordance with the limited-response duty cycle in response to a determination that the mobile communication unit is located within the vehicle.

2. The communication system of claim 1, wherein the base station is configured for determining a location of the mobile communication unit relative to the vehicle.

3. The communication system of claim 1, wherein the base station is configured to cause the mobile communication unit to operate in accordance with the limited-response duty cycle in response to a determination that the mobile communication unit is located within the vehicle and the mobile communication unit is substantially stationary relative to the vehicle.

4. The communication system of claim 3, wherein the determination that the mobile communication unit is substantially stationary relative to the vehicle is made in dependence on a detected movement communicated from the mobile communication unit to the base station.

5. The communication system of claim 1, wherein the base station is configured to cause the mobile communication unit to resume operating in accordance with a high-response duty cycle in response to an occurrence of a predetermined trigger event.

6. The communication system of claim 5, wherein the predetermined trigger event is based at least in part upon one or more of an opening of a door of the vehicle, a closing of a door of the vehicle, and/or a request to start an engine of the vehicle.

7. The communication system of claim 5, wherein the high-response duty cycle comprises a period of activity, during which the mobile communication unit is capable of receiving a transmission, and wherein the period of activity occurs without substantial interruption by a period of inactivity.

8. The communication system of claim 1, wherein the limited-response duty cycle comprises a period of inactivity, during which the mobile communication unit is unable to receive a transmission, and a period of activity, during which the mobile communication unit is capable of receiving a transmission, and wherein the period of inactivity is longer in time than the period of activity.

9. The communication system of claim 1, wherein the base station is configured for determining a location of the mobile communication unit relative to the vehicle based on a time of flight of communications between the mobile communication unit and one or more transceivers positioned in the vehicle.

10. The communication system of claim 9, wherein the base station is configured for determining a location of the mobile communication unit relative to the vehicle based on a time of flight of ultra-wide band communications between the mobile communication unit and the one or more transceivers positioned in the vehicle.

11. The communication system of claim 1, wherein the base station is configured for determining a location of the mobile communication unit relative to the vehicle based on a time of flight of communications between the mobile communication unit and three or more transceivers positioned in the vehicle.

12. The communication system of claim 1, wherein the base station is configured for determining a location of the mobile communication unit relative to the vehicle based on a time of flight of communications between the mobile communication unit and four or more transceivers positioned in the vehicle.

13. The communication system of claim 1, wherein the mobile communication unit comprises a motion sensor configured to detect movement of the mobile communication unit and to communicate the movement to the base station.

14. A vehicle comprising the communication system of claim 1.

15. A method of facilitating control over a function of a vehicle, the method comprising:
providing a base station positioned in the vehicle and a mobile communication unit, the base station comprising a first transmitter and a first receiver;
transmitting a signal from the first transmitter to the mobile communication unit;
receiving a signal from the mobile communication unit; and
causing the mobile communication unit to operate in accordance with a limited-response duty cycle in response to a determination that the mobile communication unit is located within the vehicle.

16. The method of claim 15, further comprising determining a location of the mobile communication unit relative to the vehicle.

17. The method of claim 16, further comprising causing the mobile communication unit to operate in accordance with the limited-response duty cycle in response to a determination that the mobile communication unit is located within the vehicle and the mobile communication unit is substantially stationary relative to the vehicle.

18. The method of claim 16, further comprising causing the mobile communication unit to resume operating in accordance with a high-response duty cycle in response to an occurrence of a predetermined trigger event.

19. The method of claim 15, further comprising determining a location of the mobile communication unit relative to the vehicle based on a time of flight of communications between the mobile communication unit and one or more transceivers positioned in the vehicle.

20. A vehicle configured to perform the method of claim 15.

* * * * *